US010915706B2

(12) United States Patent
Jin et al.

(10) Patent No.: US 10,915,706 B2
(45) Date of Patent: Feb. 9, 2021

(54) SORTING TEXT REPORT CATEGORIES

(71) Applicant: Advanced New Technologies Co., Ltd., George Town (KY)

(72) Inventors: Hong Jin, Hangzhou (CN); Weiqiang Wang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/888,605

(22) Filed: May 29, 2020

(65) Prior Publication Data

US 2020/0293716 A1 Sep. 17, 2020

Related U.S. Application Data

(63) Continuation of application No. PCT/CN2019/073149, filed on Jan. 25, 2019.

(30) Foreign Application Priority Data

Feb. 5, 2018 (CN) .......................... 2018 1 0113352

(51) Int. Cl.
*G06F 40/279* (2020.01)
*G06Q 10/10* (2012.01)
(Continued)

(52) U.S. Cl.
CPC ........... *G06F 40/279* (2020.01); *G06N 20/00* (2019.01); *G06Q 10/10* (2013.01); *G06Q 30/016* (2013.01); *G06Q 30/0205* (2013.01)

(58) Field of Classification Search
CPC .... G06F 40/279; G06F 40/30; G06F 16/3323; G06Q 30/0205; G06Q 30/0204
See application file for complete search history.

(56) References Cited

U.S. PATENT DOCUMENTS 9,189,526 B1 * 11/2015 Chen .................... G06F 16/9535
2007/0223699 A1 * 9/2007 Jones ................... G06F 16/2477
380/262
(Continued)

FOREIGN PATENT DOCUMENTS

CN 104008184 8/2014
CN 104008184 A * 8/2014
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Paras D Shah
(74) *Attorney, Agent, or Firm* — Fish & Richardson P.C.

(57) ABSTRACT

A computer-implemented method includes: receiving, by a computing device, a text report request from a user device associated with a user; obtaining a behavior history and personal information of the user; inputting the behavior history and the personal information of the user into a model, to obtain a plurality of personalized evaluation results, each personalized evaluation result corresponding to a respective text report category of a plurality of text report categories, in which each personalized evaluation result indicates a predicted relevance of the corresponding text report category to a problem faced by the user, and in which the model includes a classification model trained using one or more supervised learning techniques on a plurality of user behavior history samples and a plurality of personal information samples; and determining an order in which the plurality of text report categories are to be presented to the user.

18 Claims, 3 Drawing Sheets

(51) Int. Cl.
*G06N 20/00* (2019.01)
*G06Q 30/00* (2012.01)
*G06Q 30/02* (2012.01)

(56) References Cited

U.S. PATENT DOCUMENTS

| | | | | |
|---|---|---|---|---|
| 2010/0131338 | A1* | 5/2010 | Tan | G06Q 30/0253 705/14.51 |
| 2010/0131388 | A1* | 5/2010 | Law | G06Q 30/0277 705/26.1 |
| 2011/0040631 | A1 | 2/2011 | Eder | |
| 2013/0024456 | A1* | 1/2013 | Goodson | G06F 16/951 707/740 |
| 2014/0129493 | A1* | 5/2014 | Leopold | G06F 19/32 706/12 |
| 2016/0012130 | A1* | 1/2016 | Peng | G06F 16/335 707/706 |
| 2016/0196587 | A1 | 7/2016 | Eder | |
| 2016/0378771 | A1* | 12/2016 | Tholiya | G06F 16/3326 707/731 |
| 2018/0083976 | A1* | 3/2018 | Egan | H04L 63/104 |
| 2018/0181572 | A1* | 6/2018 | Guo | G06F 16/9535 |
| 2018/0300022 | A1* | 10/2018 | Kumar | G06F 16/9535 |
| 2018/0322206 | A1* | 11/2018 | Sun | G06F 16/9038 |

FOREIGN PATENT DOCUMENTS

| | | |
|---|---|---|
| CN | 105787770 | 7/2016 |
| CN | 106708821 | 5/2017 |
| CN | 107437124 | 12/2017 |
| CN | 107563429 | 1/2018 |
| CN | 108416616 | 8/2018 |
| TW | 201601104 | 1/2016 |

OTHER PUBLICATIONS

Nakamoto, "Bitcoin: A Peer-to-Peer Electronic Cash System," www.bitcoin.org, 2005, 9 pages.

PCT International Search Report and Written Opinion in International Appln. No. PCT/CN2019/073149, dated Apr. 26, 2019, 17 pages (with English Translation).

* cited by examiner

SORTING TEXT REPORT CATEGORIES

CROSS-REFERENCE TO RELATED APPLICATIONS

This application is a continuation of PCT Application No. PCT/CN2019/073149, filed on Jan. 25, 2019, which claims priority to Chinese Patent Application No. 201810113352.6, filed on Feb. 5, 2018, and each application is hereby incorporated by reference in its entirety.

TECHNICAL FIELD

The present specification relates to the field of data processing technologies, and in particular, to a method and an apparatus for sorting text report categories.

BACKGROUND

Customer services are essential to any enterprise. With the development of the Internet and popularization of intelligent end-user devices, more enterprises provide more convenient and efficient online customer services, to reduce service costs while improving service efficiency. As a part of customer service, receiving text reports from users and alleviating problems of users in a timely way can enhance the customer relationship and improve customer satisfaction. Complaints, requests, and feedbacks are example of text reports submitted by users.

An enterprise usually provides a portal for submitting a text report in various user facing scenarios on the internet, for example, an enterprise website or an enterprise client application (APP). After entering the portal for submitting a text report, a user usually needs to select a category of a problem to be complained about or reported by the user. Different categories of text reports usually correspond to different subsequent processing procedures.

SUMMARY

In view of this, the present specification provides a method for sorting text report categories, including: obtaining a behavior history and personal information of a user after a text report request of the user is received; inputting the behavior history and the personal information of the user to a personalized model, to obtain a personalized evaluation result of each text report category, where the personalized model is a classification model trained using supervised learning techniques on a plurality of user behavior history samples and personal information samples with each associated with a respective label indicating a category of a text report; and determining, based on the personalized evaluation result, an order of different categories of text reports that can be submitted by the user.

The present specification further provides an apparatus for sorting text report categories, including: an input feature acquisition unit, configured to obtain a behavior history and personal information of a user after a text report request of the user is received; a personalized evaluation unit, configured to input the behavior history and the personal information of the user to a personalized model, to obtain a personalized evaluation result of each text report category, where the personalized model is a classification model trained using supervised learning techniques on a plurality of user behavior history samples and personal information samples with each associated with a respective label indicating a category of a text report; and a sorting unit, configured to determine, based on the personalized evaluation result, an order of different categories of text reports that can be submitted by the user.

The present specification provides a computer device, including a memory and a processor, where the memory stores a computer program that can be run by the processor, and when the processor runs the computer program, the steps of the method for sorting text report categories are performed.

The present specification provides a computer-readable storage medium, where the compute-readable storage medium stores a computer program, and when the computer program is run by a processor, the steps of the method for sorting text report categories are performed.

It can be seen from the previous technical solutions that in the implementations of the present specification, the behavior history and the personal information of the user who sends the text report request are used as inputs to the personalized model, to obtain the personalized evaluation result of each text report category, and the order of the different categories of the text reports that can be submitted by the user is determined based on the personalized evaluation result, so that there is a higher probability that the user selects a correct text report category. As such, text report processing speed can be accelerated, customer satisfaction can be improved, and each category of text report data can be more accurate, which helps to obtain a more accurate data mining result.

DESCRIPTION OF IMPLEMENTATIONS

Figure 1:
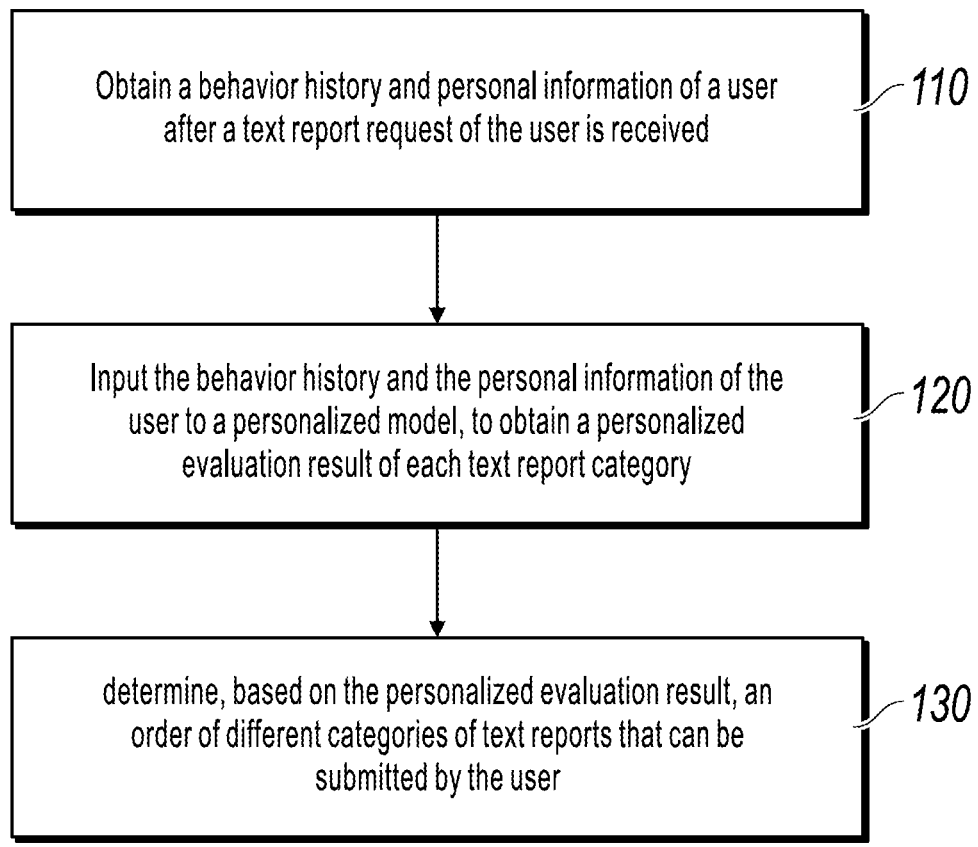
FIG. 1 is a flowchart illustrating a method for sorting text report categories, according to an implementation of the present specification.

When using a text report function, most users are eager to submit problems faced by the users. When selecting a text report category, the users usually make a choice when viewing the first category that is similar to the problems faced by the users, and rarely view all categories to select the most suitable one. Therefore, an order of text report categories greatly affects the accuracy of user selection.

Therefore, the implementations of the present specification provide a new method for sorting text report categories. A personalized model trained by using user behavior history samples and personal information samples is used, and a behavior history and personal information of a user who sends a text report request are used as inputs, to obtain a personalized evaluation result of each text report category for the user as a basis for sorting the text report categories, so that an order of the different categories of text reports is more suitable for the user, and there is a higher probability that the user selects a correct category. As such, text report processing efficiency can be improved, and an enterprise can obtain more accurate text report classification data, which provides a better basis for data mining.

The implementations of the present specification can run on any device with computing and storage capabilities, for example, a mobile phone, a tablet computer, a personal computer (PC), a laptop, or a server. Alternatively, functions in the implementations of the present specification can be implemented by logical nodes running on two or more devices.

In the implementations of the present specification, submitting a text report includes various behaviors of the user to provide negative feedback to a network service provider, for example, providing negative comments to the network service provider, submitting negative information, and providing a problem that needs to be alleviated in cooperation with the network service provider. Implementations are not limited.

The text report behavior is usually caused by a previous network event, and therefore the behavior of the user in a network before submitting a text report is usually associated with the text report category. In addition, some personal information reflecting individual features of the user is also associated with the text report category. Therefore, in the implementations of the present specification, a classification model is generated based on the behavior history and the personal information of the user, and the classification model is referred to as the personalized model in the present specification, to predict a category of a text report that may be submitted by the user. The behavior history and the personal information of the user are used as inputs to the personalized model, and the personalized evaluation result of the text report category is the output of the personalized model. As a model trained using supervising learning techniques, the personalized model is trained on a plurality of user behavior history samples and personal information samples with each associated with a label indicating a category of a text report actually submitted by the user.

The behavior history of the user can include any network behavior history of the user in a certain time period before the user requests to submit a text report, for example, can be one or more of a browsing history of the user, a chat history of the user, and a function use history of the user. The behavior history of the user can be a behavior history of the user at a certain website, several websites, or a client application, or can be a behavior history of the user at a certain end-user device or a behavior history of the user for a certain account. Implementations are not limited.

The personal information of the user can include any information that can reflect individual features of the user, for example, one or more of geographical location information of the user, a personalized user label that reflects a preference of the user, and an IP address of the user.

Assume that N (N is a natural number greater than or equal to 2) is the quantity of text report categories. In this case, the personalized classification model can be a multinomial classification model, and outputs of the personalized classification model are personalized evaluation results of the N text report categories. Alternatively, N binary classification models can be used to make a prediction for the text report categories. To be specific, each binary classification model corresponds to one text report category, and the outputs of the binary classification model are personalized evaluation results of the text report category.

In addition, a classification algorithm used by the personalized model is not limited in the implementations of the present specification. For example, the personalized model can be a random forest model, a gradient boosting decision tree (GBDT) model, an extreme gradient boosting (XG-BOOST) model, or other classification models.

In the implementations of the present specification, a procedure of the method for sorting text report categories is shown in FIG. 1.

Step 110: Obtain a behavior history and personal information of a user after a text report request of the user is received.

After logging in, the user usually can send the text report request by using a portal for submitting a text report set by a network service provider. For example, the user can launch a text report page at a website of the network service provider, or click a text report button in a client application of the network service provider. A server of the network service provider receives the text report request sent by an end-user device used by the user.

After receiving the text report request, based on a specific implementation of the server in an actual application scenario and specific content of the behavior history and the personal information, the network service provider can read the behavior history and/or the personal information of the user from a predetermined network location, a predetermined database, etc. that store the behavior history and/or the personal information of the user, or can request another server that maintains the behavior history and/or the personal information of the user, and obtain the behavior history and/or the personal information of the user from a response of the another server, implementations are not limited.

Step 120: Input the behavior history and the personal information of the user to a personalized model, to obtain a personalized evaluation result of each text report category.

For a personalized multinomial classification model, the behavior history and the personal information of the user are input to the multinomial classification model, to obtain personalized evaluation results of N text report categories. For N personalized binary classification models, the behavior history and the personal information of the user are input into the N binary classification models, and the output of each binary classification model corresponds to a personalized evaluation result of a text report category for the binary classification model.

Step 130: Determine, based on the personalized evaluation result, an order of different categories of text reports that can be submitted by the user.

The network service provider determines, based on the personalized evaluation result of each text report category for the user, the order of the different categories of the text reports that can be submitted by the user, and returns the order to the end-user device of the user that sends the text report request. The end-user device of the user displays the text report categories in the returned order to the user for user selection. Displaying the categories of text reports that the user is more likely to submit towards the beginning of a listing of possible categories can increase the probability that the user makes a correct classification selection.

In addition to the personalized evaluation result, the order of the different categories of the text reports that can be submitted by the user can be determined by comprehensively considering other factors. The following provides description by using examples.

First Example

Some categories of text reports surge in a specific time period, for example, reports on plane ticket or bus/train ticket fraud before Spring Festival and reports on job scam during the holiday. In such an example, a universal evaluation result of the text report categories can be determined based on the quantity of times each text report category occurs in a first predetermined time period, and then the order of the different categories of the text reports that can be submitted by the user is determined based on the universal evaluation result and the personalized evaluation result of the text report category for the user.

Second Example

Different categories of text reports occur with different probabilities in different regions. For example, a unitary and concentrated text report category occurs in some remote regions. In such an example, a regional evaluation result of the text report categories can be determined based on the quantity of times each text report category occurs in a second predetermined time period in a region in which the user is located, and then the order of the different categories of the text reports that can be submitted by the user is determined based on the regional evaluation result and the personalized evaluation result of the text report category for the user.

In the previous two examples, a specific sorting method can be determined based on factors such as a specific status in an actual application scenario, impact of the universal evaluation result on the order of the different categories of the text reports, and/or impact of the regional evaluation result on the order of the different categories of the text reports. Implementations are not limited in the implementations of the present specification. For example, a different score can be set in the universal evaluation result and/or the regional evaluation result based on the quantity of occurrence times of each text report category. The weighted sum of a score in the universal evaluation result and/or the regional evaluation result and a personalized evaluation result is used as a final evaluation result of a certain text report category, and the text report categories are sorted based on the final evaluation result.

In addition, the universal evaluation result and the regional evaluation result in the previous two examples can be used in conjunction with one another. The following provides the third example in which the universal evaluation result and the regional evaluation result are used in conjunction with one another. P (P is a natural number less than N) text report categories that most frequently occur in a first predetermined time period are used as universal categories; Q (Q is a natural number not greater than (N−P)) text report categories, excluding the P universal categories, that most frequently occur in a second predetermined time period are used as regional categories; and when the order of the different categories of the text reports is determined, the P universal categories are sorted in descending order based on the quantity of occurrence times, the Q regional categories are sorted in descending order based on the quantity of occurrence times, and (N−P−Q) text report categories excluding the universal categories and the regional categories are sorted based on the personalized evaluation result. In this example, the P universal categories are first sorted, then the Q regional categories are sorted, and then the other text report categories are sorted based on the personalized evaluation result.

It can be seen that in the implementations of the present specification, the personalized model trained by using the user behavior history samples and personal information samples is used, and the behavior history and the personal information of the user who sends the text report request are used as inputs to the personalized model, to obtain the personalized evaluation result of each text report category for the user as a basis for sorting the text report categories, so that the order of the different categories of the text reports is more suitable for the user, and there is a higher probability that the user selects a correct text report category. As such, text report processing speed can be accelerated, customer satisfaction can be improved, and each category of text report data can be more accurate, which provides a better basis for data mining.

Specific implementations of the present specification are described above. Other implementations fall within the scope of the appended claims. In some cases, the actions or steps described in the claims can be performed in an order different from the order in the implementations and the desired results can still be achieved. In addition, the process described in the accompanying drawings does not necessarily require a particular execution order to achieve the desired results. In some implementations, multi-tasking and parallel processing can be advantageous.

In an application example of the present specification, a third-party mobile payment platform provides a report portal for a user in a client APP of the third-party mobile payment platform, to detect and stop illegal behaviors through user reporting in a timely way and protect fund security of users. After clicking the report button in the APP, the user can select a report category on the launched category selection page to report this category of event. The report category includes job scam, scalping, pornography, gambling, financial fraud, transaction fraud, etc.

At a server of the third-party mobile payment platform, personalized multinomial classification models are built by using a browsing history and a chat history of the user in the client APP within 24 hours as a behavior history of the user and using a personalized user label (for example, online shopper, movie fan, and fitness maniac), an IP address of the user, and geographical location information of the user as personal information of the user, and are trained by using sample data marked with a category of a report submitted by the user.

After the user clicks the report button, the APP sends a report request of the user to the server. The server reads the personalized user label of the user from a user database, and obtains the IP address of an end-user device of the user and the geographical location information of the end-user device by interacting with the client APP. The server queries the browsing history and the chat history of the user in the APP within the past 24 hours from the user behavior database, and inputs the personalized user label, the IP address, the geographical location information, the browsing history, and the chat history of the user to the personalized multinomial classification model, to obtain a personalized evaluation result of each report category.

Figure 2:
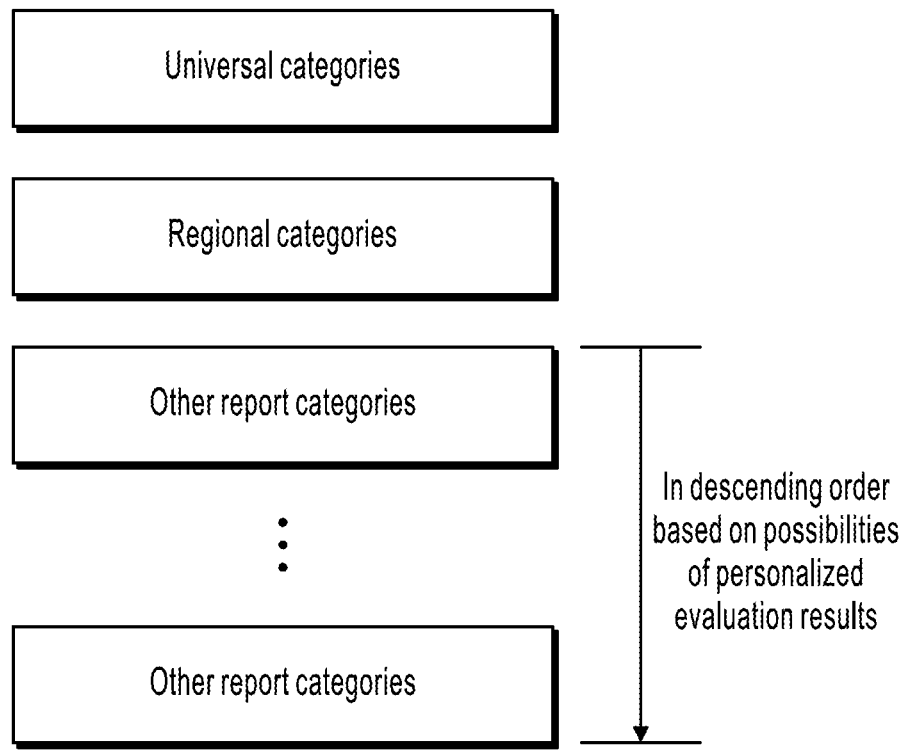
FIG. 2 is a schematic diagram illustrating a method for sorting report categories in an application example of the present specification.

The server counts reports submitted by all users for each category in the past week, and uses a category with the maximum quantity of reports as a universal category. Based on the geographical location information of the user, the server counts the quantity of reports for each category in the past week in a region (including the city, town, suburb, or countryside) in which the user is located, and uses a category, excluding the universal category, with the maximum quantity of reports as a regional category. The server uses the universal category as the first term, uses the regional category as the second term, and sequentially sorts report categories excluding the universal category and the regional category from the third term in descending order based on possibilities of personalized evaluation results, as shown in FIG. 2. The server returns the report categories and an order of the report categories to the APP, and the APP displays the report categories to the user. The user views, on the category selection page, the report categories arranged in the previous order.

Figure 3:
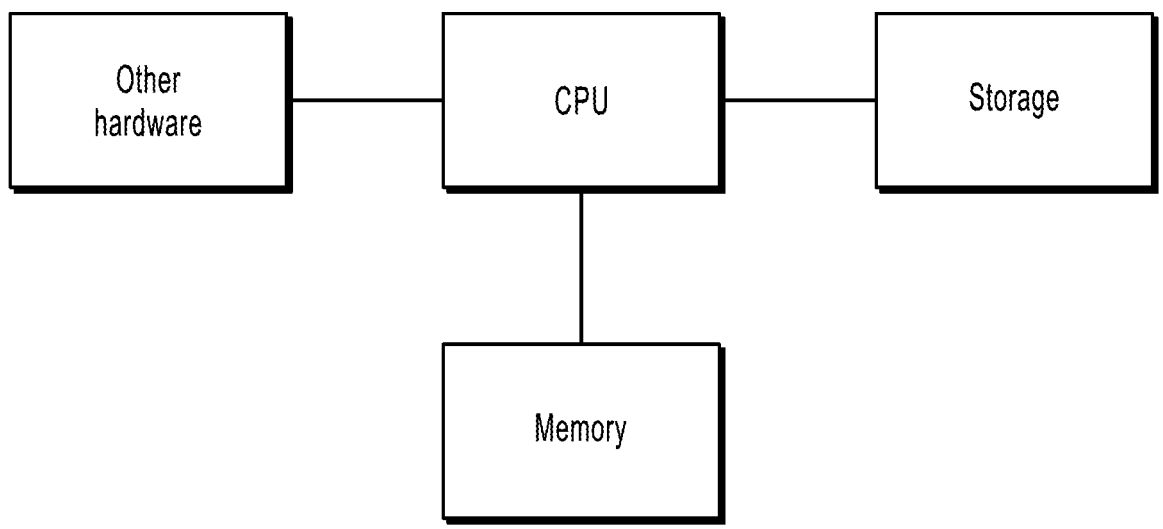
FIG. 3 is a structural diagram of hardware of a device for running an implementation of the present specification.

Corresponding to the previous procedure implementation, the implementations of the present specification further provide an apparatus for sorting text report categories. The apparatus can be implemented by software, can be implemented by hardware, or can be implemented by a combination of hardware and software. Software implementation is used as an example. As a logical apparatus, the apparatus is formed by reading a corresponding computer program by a central processing unit (CPU) in a device in which the apparatus is located and running the computer program in a memory. In terms of hardware, in addition to the CPU, the memory, and the storage shown in FIG. 3, the device in which the apparatus for sorting text report categories is located usually includes other hardware such as a chip for sending and receiving radio signals and/or other hardware such as a card configured to implement a network communications function.

Figure 4:
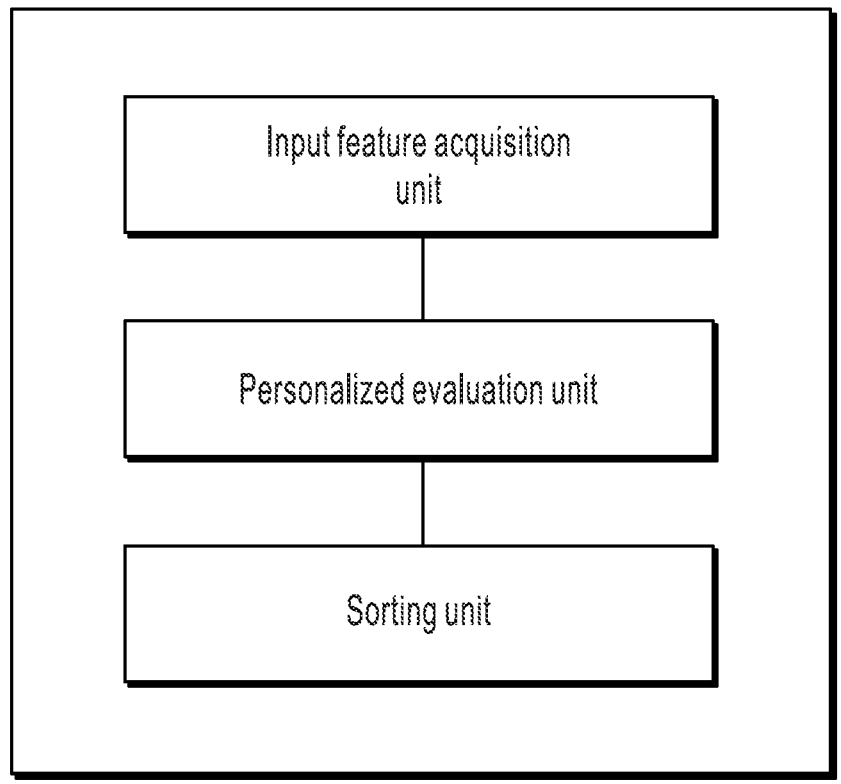
FIG. 4 is a logical structural diagram of an apparatus for sorting text report categories, according to an implementation of the present specification.

FIG. 4 illustrates an apparatus for sorting text report categories, according to an implementation of the present specification. The apparatus includes an input feature acquisition unit, a personalized evaluation unit, and a sorting unit. The input feature acquisition unit is configured to obtain a behavior history and personal information of a user after a text report request of the user is received. The personalized evaluation unit is configured to input the behavior history and the personal information of the user to a personalized model, to obtain a personalized evaluation result of each text report category, where the personalized model is a classification model trained using supervised learning techniques on a plurality of user behavior history samples and personal information samples with each associated with a respective label indicating a category of a text report. The sorting unit is configured to determine, based on the personalized evaluation unit, an order of different categories of text reports that can be submitted by the user.

Optionally, the personalized model includes a multinomial classification model or N binary classification model, and N is the quantity of text report categories.

Optionally, the personalized model uses a random forest algorithm, a gradient boosting decision tree (GBDT) algorithm, or an extreme gradient boosting (XGBOOST) algorithm.

Optionally, the behavior history of the user includes at least one of the following: a browsing history of the user, a chat history of the user, and a function use history of the user; and the personal information of the user includes at least one of the following: geographical location information of the user, a personalized user label of the user, and an IP address of the user.

Optionally, the apparatus further includes a universal evaluation unit, configured to determine a universal evaluation result of the text report categories based on the quantity of times each text report category occurs in a first predetermined time period; and the sorting unit is specifically configured to determine, based on the universal evaluation result and the personalized evaluation result for the user, the order of the different categories of the text reports that can be submitted by the user.

Optionally, the apparatus further includes a regional evaluation unit, configured to determine a regional evaluation result of the text report categories based on the quantity of times each text report category occurs in a second predetermined time period in a region in which the user is located; and the sorting unit is specifically configured to determine, based on the regional evaluation result and the personalized evaluation result for the user, the order of the different categories of the text reports that can be submitted by the user.

Optionally, the apparatus further includes a universal category unit and a regional category unit, the universal category unit is configured to use P text report categories that most frequently occur in a first predetermined time period as universal categories, the regional category unit is configured to use Q text report categories, excluding the P universal categories, that most frequently occur in a second predetermined time period as regional categories, and the sorting unit is specifically configured to sort the P universal categories in descending order based on the quantity of occurrence times, sort the Q regional categories in descending order based on the quantity of occurrence times, and sort (N–P–Q) text report categories excluding the universal categories and the regional categories based on the personalized evaluation result, where N is the quantity of text report categories, P is a natural number less than N, and Q is a natural number not greater than (N–P).

An implementation of the present specification provides a computer device, and the computer device includes a memory and a processor. The memory stores a computer program that can be run by the processor. When the processor runs the stored computer program, the steps of the method for sorting text report categories in the implementations of the present specification are performed. For detailed description of the steps of the method for sorting text report categories, references can be made to the previous content. Details are omitted for simplicity.

An implementation of the present specification provides a computer-readable storage medium. The storage medium stores a computer program. When the computer program is run by a processor, the steps of the method for sorting text report categories in the implementations of the present specification are performed. For detailed description of the steps of the method for sorting text report categories, references can be made to the previous content. Details are omitted for simplicity.

The previous descriptions are merely better examples of implementations of the present specification, but are not intended to limit the present application. Any modification, equivalent replacement, or improvement made without departing from the spirit and principle of the present application shall fall within the protection scope of the present application.

In a typical configuration, a computing device includes one or more central processing units (CPUs), input/output interfaces, network interfaces, and memories.

The memory can include a non-persistent memory, a random access memory (RAM), and/or a nonvolatile memory in a computer readable medium, for example, a read-only memory (ROM) or a flash memory (flash RAM). The memory is an example of the computer readable medium.

The computer readable medium includes persistent, non-persistent, removable, and irremovable media that can store information by using any method or technology. The information can be a computer readable instruction, a data structure, a program module, or other data. Examples of the computer storage medium include but are not limited to a phase change RAM (PRAM), a static RAM (SRAM), a dynamic RAM (DRAM), another category of RAM, a ROM, an electrically erasable programmable read only memory (EEPROM), a flash memory or another memory technology, a compact disc read-only memory (CD-ROM), a digital versatile disc (DVD), or other optical storage, a cassette, cassette magnetic disk storage, or another magnetic storage device or any other non-transmission medium. The computer storage medium can be configured to store information that can be accessed by a computing device. As described in the present application, the computer readable medium does not include computer readable transitory media such as a modulated data signal and a carrier.

It is worthwhile to further note that the terms "include", "comprise", and their any other variants are intended to cover a non-exclusive inclusion, so that a process, a method, a product, or a device that includes a list of elements not only includes those elements but also includes other elements which are not expressly listed, or further includes elements inherent to such process, method, product, or device. Without more constraints, an element preceded by "includes a . . . " does not preclude the existence of additional identical elements in the process, method, product, or device that includes the element.

A person skilled in the art should understand that an implementation of the present specification can be provided as a method, a system, or a computer program product. Therefore, the implementations of the present application can use a form of hardware only implementations, software only implementations, or implementations with a combination of software and hardware. In addition, the implementations of the present specification can use a form of a computer program product that is implemented on one or more computer-usable storage media (including but not limited to a disk memory, a CD-ROM, an optical memory, etc.) that include computer-usable program code.

What is claimed is:

1. A computer-implemented method, comprising:
receiving, by a computing device, a text report request from a user device associated with a user;
obtaining a behavior history and personal information of the user;
inputting the behavior history and the personal information of the user into a model, to obtain, as an output of the model, a plurality of personalized evaluation results, each personalized evaluation result corresponding to a respective text report category of a plurality of text report categories,
wherein each personalized evaluation result indicates a predicted relevance of the corresponding text report category to a problem faced by the user, and
wherein the model comprises a classification model trained using one or more supervised learning techniques on a plurality of user behavior history samples and a plurality of personal information samples, each sample associated with a respective label indicating a category of a text report selected by a user corresponding to the sample;
determining that a predetermined first number of text report categories of the plurality of text report categories are each selected more frequently than each other text report category by all users during a first predetermined time period;
determining that a predetermined second number of text report categories of the plurality of text report categories, excluding the predetermined first number of text report categories, are selected more frequently than each other text report category, except for the predetermined first number of text report categories, by users in a particular region during a second predetermined time period; and
determining, based on the plurality of personalized evaluation results, an order in which the plurality of text report categories are to be presented to the user, comprising sorting the plurality of text report categories in an order in which
the predetermined first number of text report categories are ordered in descending order based on respective quantities of user selections,
the predetermined second number of text report categories are ordered after the predetermined first number of text report categories, in descending order based on respective quantities of user selections, and
remaining text report categories of the plurality of text report categories are ordered in descending order after the predetermined second number of text report categories, sorted in an order based on respective personalized evaluation results corresponding to each remaining text report category.

2. The computer-implemented method of claim 1, wherein the model comprises at least one of a multinomial classification model and N binary classification models, where N is a quantity of the plurality of text report categories.

3. The computer-implemented method of claim 1, wherein the model is a personalized model trained based on one or more text report categories previously selected by the user.

4. The computer-implemented method of claim 1, wherein the behavior history of the user comprises at least one of a browsing history of the user, a chat history of the user, and a function use history of the user; and
wherein the personal information of the user comprises at least one of geographical location information of the user device, a personalized user label of the user, and an IP address of the user device.

5. The computer-implemented method of claim 1, comprising:
determining a number of times each text report category of the plurality of text report categories is selected during the first predetermined time period; and
determining the order in which the plurality of text report categories are to be presented to the user based on the determined number of times each text report category is selected during the first predetermined time period.

6. The computer-implemented method of claim 1, comprising:
determining a number of times each text report category is selected by users in the particular region during the second predetermined time period; and
determining the order in which the plurality of text report categories are to be presented to the user based on the determined number of times each text report category is selected by users in the particular region during the second predetermined time period.

7. A non-transitory, computer-readable medium storing one or more instructions executable by a computer system to perform operations comprising:
receiving, by a computing device, a text report request from a user device associated with a user;
obtaining a behavior history and personal information of the user;
inputting the behavior history and the personal information of the user into a model, to obtain, as an output of the model, a plurality of personalized evaluation results, each personalized evaluation result corresponding to a respective text report category of a plurality of text report categories, wherein each personalized evaluation result indicates a predicted relevance of the corresponding text report category to a problem faced by the user, and wherein the model comprises a classification model trained using one or more supervised learning techniques on a plurality of user behavior history samples and a plurality of personal information samples, each sample associated with a respective label indicating a category of a text report selected by a user corresponding to the sample;

determining that a predetermined first number of text report categories of the plurality of text report categories are each selected more frequently than each other text report category by all users during a first predetermined time period;

determining that a predetermined second number of text report categories of the plurality of text report categories, excluding the predetermined first number of text report categories, are selected more frequently than each other text report category, except for the predetermined first number of text report categories, by users in a particular region during a second predetermined time period; and determining, based on the plurality of personalized evaluation results, an order in which the plurality of text report categories are to be presented to the user, comprising sorting the plurality of text report categories in an order in which the predetermined first number of text report categories are ordered in descending order based on respective quantities of user selections, the predetermined second number of text report categories are ordered after the predetermined first number of text report categories, in descending order based on respective quantities of user selections, and remaining text report categories of the plurality of text report categories are ordered in descending order after the predetermined second number of text report categories, sorted in an order based on respective personalized evaluation results corresponding to each remaining text report category.

8. The non-transitory, computer-readable medium of claim 7, wherein the model comprises at least one of a multinomial classification model and N binary classification models, where N is a quantity of the plurality of text report categories.

9. The non-transitory, computer-readable medium of claim 7, wherein the model is a personalized model trained based on one or more text report categories previously selected by the user.

10. The non-transitory, computer-readable medium of claim 7, wherein the behavior history of the user comprises at least one of a browsing history of the user, a chat history of the user, and a function use history of the user; and wherein the personal information of the user comprises at least one of geographical location information of the user device, a personalized user label of the user, and an IP address of the user device.

11. The non-transitory, computer-readable medium of claim 7, wherein the operations comprise:

determining a number of times each text report category of the plurality of text report categories is selected during the first predetermined time period; and determining the order in which the plurality of text report categories are to be presented to the user based on the determined number of times each text report category is selected during the first predetermined time period.

12. The non-transitory, computer-readable medium of claim 7, wherein the operations comprise:

determining a number of times each text report category is selected by users in the particular region during the second predetermined time period; and determining the order in which the plurality of text report categories are to be presented to the user based on the determined number of times each text report category is selected by users in the particular region during the second predetermined time period.

13. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

receiving, by a computing device, a text report request from a user device associated with a user;

obtaining a behavior history and personal information of the user;

inputting the behavior history and the personal information of the user into a model, to obtain, as an output of the model, a plurality of personalized evaluation results, each personalized evaluation result corresponding to a respective text report category of a plurality of text report categories, wherein each personalized evaluation result indicates a predicted relevance of the corresponding text report category to a problem faced by the user, and wherein the model comprises a classification model trained using one or more supervised learning techniques on a plurality of user behavior history samples and a plurality of personal information samples, each sample associated with a respective label indicating a category of a text report selected by a user corresponding to the sample;

determining that a predetermined first number of text report categories of the plurality of text report categories are each selected more frequently than each other text report category by all users during a first predetermined time period;

determining that a predetermined second number of text report categories of the plurality of text report categories, excluding the predetermined first number of text report categories, are selected more frequently than each other text report category, except for the predetermined first number of text report categories, by users in a particular region during a second predetermined time period; and determining, based on the plurality of personalized evaluation results, an order in which the plurality of text report categories are to be presented to the user, comprising sorting the plurality of text report categories in an order in which the predetermined first number of text report categories are ordered in descending order based on respective quantities of user selections, the predetermined second number of text report categories are ordered after the predetermined first number of text report categories, in descending order based on respective quantities of user selections, and remaining text report categories of the plurality of text report categories are ordered in descending order after the predetermined second number of text report categories, sorted in an order based on respective personalized evaluation results corresponding to each remaining text report category.

14. The computer-implemented system of claim 13, wherein the model comprises at least one of a multinomial classification model and N binary classification models, where N is a quantity of the plurality of text report categories.

15. The computer-implemented system of claim 13, wherein the model is a personalized model trained based on one or more text report categories previously selected by the user.

16. The computer-implemented system of claim 13, wherein the behavior history of the user comprises at least one of a browsing history of the user, a chat history of the user, and a function use history of the user; and
   wherein the personal information of the user comprises at least one of geographical location information of the user device, a personalized user label of the user, and an IP address of the user device.

17. The computer-implemented system of claim 13, wherein the operations comprise:
   determining a number of times each text report category of the plurality of text report categories is selected during the first predetermined time period; and
   determining the order in which the plurality of text report categories are to be presented to the user based on the determined number of times each text report category is selected during the first predetermined time period.

18. The computer-implemented system of claim 13, wherein the operations comprise:
   determining a number of times each text report category is selected by users in the particular region during the second predetermined time period; and
   determining the order in which the plurality of text report categories are to be presented to the user based on the determined number of times each text report category is selected by users in the particular region during the second predetermined time period.

* * * * *